FIP8102 OR 3,939,420

T5273W X5382R

United States Patent

Risberg et al.

3,939,420

Feb. 17, 1976

[54] DEBUGGING ARRANGEMENT

[75] Inventors: Sture Risberg, Enskede; Alf Lindgren, Täby; Kjell Rixon; Rickard Walldén, both of Tyreso; Bengt Brundin, Sollentuna, all of Sweden

[73] Assignee: Sture Risberg, Enskede, Sweden

[22] Filed: Jan. 15, 1974

[21] Appl. No.: 433,610

[52] U.S. Cl. .................................... 325/67; 325/363
[51] Int. Cl.[2] ............................................ H04B 1/46
[58] Field of Search ......... 325/26, 29, 67, 133, 363, 325/364; 324/96, 144, 158; 343/18 R, 18 E

[56] References Cited

UNITED STATES PATENTS

| | | | |
|---|---|---|---|
| 3,239,761 | 3/1966 | Goode | 325/55 X |
| 3,320,535 | 5/1967 | Broadhead, Jr. | 325/49 |
| 3,462,554 | 8/1969 | Steel, Jr. | 343/200 X |
| 3,466,652 | 9/1969 | Heyser | 325/67 |
| 3,473,127 | 10/1969 | Williams et al. | 325/364 |

*Primary Examiner*—Benedict V. Safourek
*Attorney, Agent, or Firm*—Pollock, Vande Sande & Priddy

[57] ABSTRACT

Method and apparatus for detecting the presence of a surreptitiously placed radio transmitter or bug. An audio tone signal is transmitted within the confined space containing the bug, and the tone signal has a predetermined frequency and a predetermined amplitude. The tone signal energizes the microphone of the bug, causing it to transmit a radio frequency signal which is modulated according to the tone signal. The radio frequency is then demodulated and the resulting demodulated signal is applied to a narrow pass band filter which is tuned to the audio tone signal. The output of the filter is sensed to determine the presence of the bug.

9 Claims, 4 Drawing Figures

DEBUGGING ARRANGEMENT

Small radio transmitters with microphones, which secretly have been placed in office rooms, conference halls etc., to record and transmit conferences and conversation, are contemplated to become common, and detecting arrangements for discovering the presence of such transmitters are in both the public and private interest. The present invention relates to a method and apparatus for discovering such transmitters or "bugs" within a confined area, by transmitting one or several search tones within or closely above the audiable frequency range. No debugging arrangement using search signals is previously known.

Figure 1:
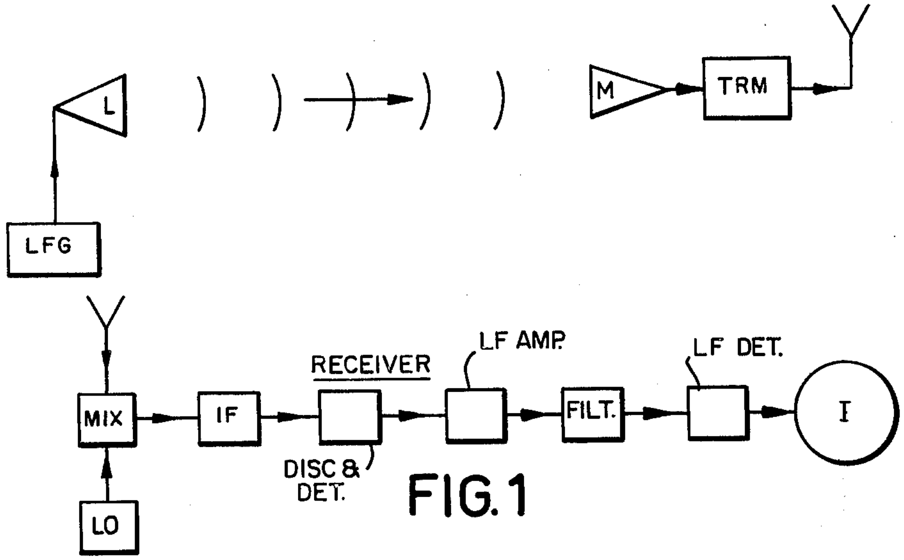
Figure 2:
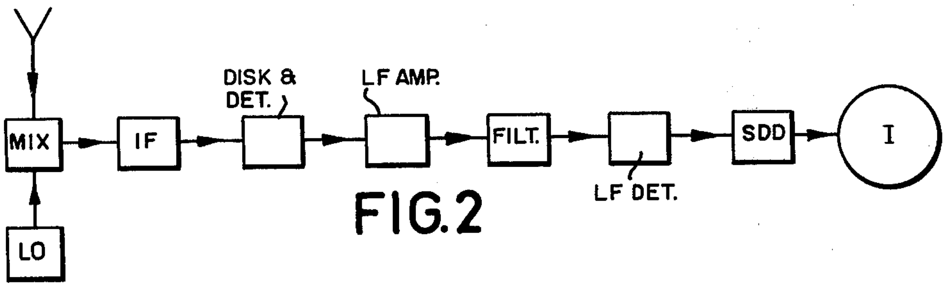
Figure 3:
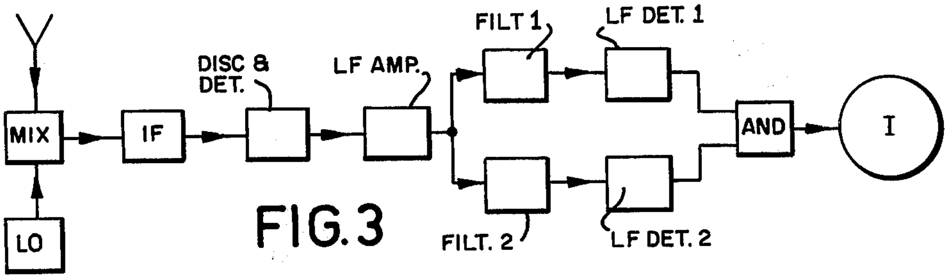
Figure 4:
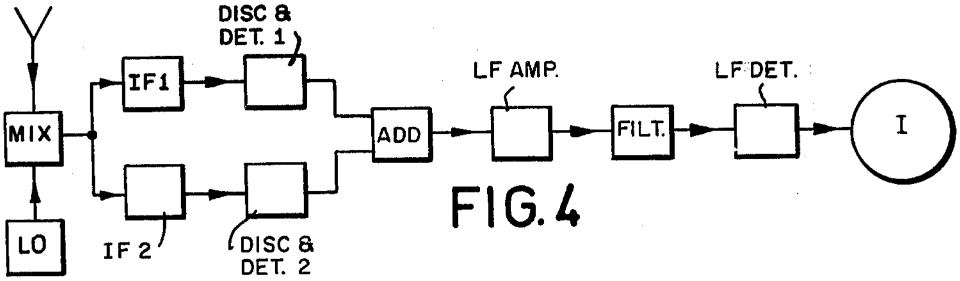

In the drawings, FIG. 1 schematically shows a bug and a debugging arrangement according to the invention, and FIGS. 2–4 schematically show alternative embodiments of the radio receiver of the arrangement shown in FIG. 1.

In FIG. 1 there is shown a bug comprising a microphone M and a radio transmitter TRM. The arrangement for discovering the presence of the bug comprises a low frequency generator LFG connected to a loudspeaker L generating one or more low frequency signals of well defined frequency, and a superheterodyne radio receiver having wide-band sensitivity or being tunable. The receiver comprises local oscillator LO, mixer MIX, intermediate frequency amplifier IF, detector and frequency discriminator DISC and DEC, low frequency amplifier LF AMD, filter FILT, having a pass-band less than 1 Hz wide, low frequency detector LF and DET signal level indicator I. An oscillator having saw-tooth shaped frequency modulation may be used as local oscillator LO in case of a wide band receiver in order to make the receiver more sensitive to both AM and FM modulated signals. This kind of comb-spectrum generation gives much less conversion loss in the mixer than pulsed harmonic generation.

The filter FILT has a very narrow pass-band for passing signals having the frequency of the low frequency generator LFG. The indicator I may comprise a pointer instrument or a lamp preceeded by a comparator. The low frequency generator LFG with loudspeaker L may be mechanically connected to the receiver into a single, portable unit. Alternatively it is possible to have a separate receiver, whereby the search tone may be transmitted simultaneously to several rooms by means of an intercom system.

During debugging operation, the tone generated by the low frequency generator LFG is transmitted by means of the loudspeaker L into the room to be checked. The tone from the loudspeaker L energizes the microphone M, and the transmitter TRM transmits a signal which is modulated with said tone. The receiver receives and demodulates the signal, which thus is able to pass the filter FILT, whereby the indicator I is energized, indicating the presence of a bug.

In FIG. 2 there is schematically shown another embodiment of the radio receiver of FIG. 1. Between the low frequency detector LF DET and the indicator I a signal duration discriminator SDD, is connected which is designed to let through only such filtered and rectified signals which have a longer duration than the short transient signals caused by narrow-band filtered talk or music. Thereby interfering influence false alarm from broadcasting or communication transmitters is reduced.

It is also possible to arrange the low frequency generator LFG to produce two separate frequencies. An embodiment of the receiver to be used together with such a generator LFG is shown in FIG. 3. The low frequency part of the receiver is provided with two parallel connected filters FILT 1 and FILT 2 each having a narrow pass-band corresponding to a respective one of said two separate frequencies. The outputs of the filters FILT 1 and FILT 2 are connected through low frequency detectors LF DET 1 and LF DET 2, respectively, and through a common AND-gate to the indicator I. Thus, the indicator is activated only when the two frequencies are present simultaneously. It is also possible to connect further filter circuits in parallel between the low frequency amplifier LF AMP and the AND-gate, whereby the low frequency generator LFG is arranged to generate the corresponding number of separate frequencies. Said frequencies are preselected to minimize the probability of their simultaneous occurring in talk and music by choosing the frequencies in such a way that the difference between any two tones is less than the lowest fundamental tone in normal speech and so that the frequencies do not coincide with any tone in the music scale. Thereby interfering influence from broadcasting and communication transmitters is reduced.

In FIG. 4 there is shown another embodiment of the receiver of FIG. 1 provided with two parallel intermediate frequency amplifiers IF 1 and IF 2 having slightly different mean frequencies each being connected through a frequency discriminator DISC & DEC 1 and DISC & DEC 2, respectively, and through a common adding circuit ADD to the low frequency amplifier LF AMP. Thereby, the narrow gaps in frequency coverage at FM-reception is eliminated, which gaps inherently are present in an ordinary receiver.

By providing means for transposing the audio frequency band in a radio transmitter bug hidden in a room, the bug becomes undiscoverable by means of a single search tone, the price to be paid being increased size, current consumption and complexity. To be able to discover such bugs two separate frequencies are generated in the low frequency generator LFG, and the filter in the low frequency unit of the receiver is designed for the difference between said two frequencies. A signal with said difference frequency is generated either in the unlinear part of the ordinary frequency discriminator and detector or in a separate unlinear device preceding the narrow band filter. Another way to discover such a bug is to apply a modulation upon said search tone, whereby the receiver is arranged to detect said modulation.

If it is desirable to avoid warning the listening intruder by sending an audiable tone, the frequency of the signal generated by the audio frequency generator may be slightly higher than the audio band. In case the microphone M of the radio transmitter bug is not responsive to such high frequencies, the transmitter may be modulated by direct acoustical influence upon frequency determining elements of the transmitter (microphonism).

What is claimed is:

1. A method for detecting the presence within a confined space of a covert radio transmitter or "bug" having a microphone comprising the steps of:

transmitting within said confined space at least one audio tone signal having a predetermined frequency and a predetermined amplitude, receiving radio frequency signals generated by said bug and modulated by said audio signal, demodulating said received radio frequency signals and applying said demodulated signals to a narrow pass-band filter which is tuned to said audio tone signal, and sensing the output of said filter to provide a distinctive indication of the presence of a bug.

2. Apparatus responsive to the presence of a covert radio transmitter or "bug" within a confined space having a microphone including:

tone generating means for generating a tone with a predetermined frequency, a loudspeaker for transmitting said tone within said confined space with a predetermined amplitude, a receiver responsive to radio frequency including a low-frequency amplifier for amplifying said tone and a narrow band-pass filter tuned to pass said tone signal, and means responsive to the amplitude of the output of said filter.

3. The apparatus of claim 2 wherein said receiver has a wide-band sensitivity.

4. The apparatus of claim 2 wherein said receiver is tunable.

5. The apparatus of claim 2 which further includes a signal duration discriminator, said discriminator including means effective to pass only those signals which have a duration longer than transient signals caused by normal conversation or music and passed through said filter.

6. The apparatus of claim 2 wherein said tone generating means produces at least two discrete frequencies, said receiver being provided with at least two filters connected in parallel, each of said filters having a narrow pass-band for passing signals of a respective one of said discrete frequencies, the outputs of said filters being connected through low-frequency-detectors and an AND-gate to said responsive means, whereby said frequencies are preselected to minimize the probability of their simultaneous occurrence in talk or music.

7. The apparatus of claim 2 wherein said receiver includes two parallel intermediate frequency amplifiers, each being connected to a separate frequency discriminator, the outputs of said intermediate amplifier being connected through an adding circuit and through a low-frequency amplifier to said responsive means.

8. The apparatus of claim 2 wherein said tone generating means produces two discrete frequencies, said narrow pass-band filter passing signals having a frequency corresponding to the difference between said two discrete frequencies.

9. The apparatus of claim 2 wherein said tone generating means produces a frequency which is higher than audio frequency.

* * * * *